Oct. 20, 1931.  R. C. MOUNTZ  1,828,612
BRAKE MECHANISM
Filed Aug. 21, 1930  3 Sheets-Sheet 1
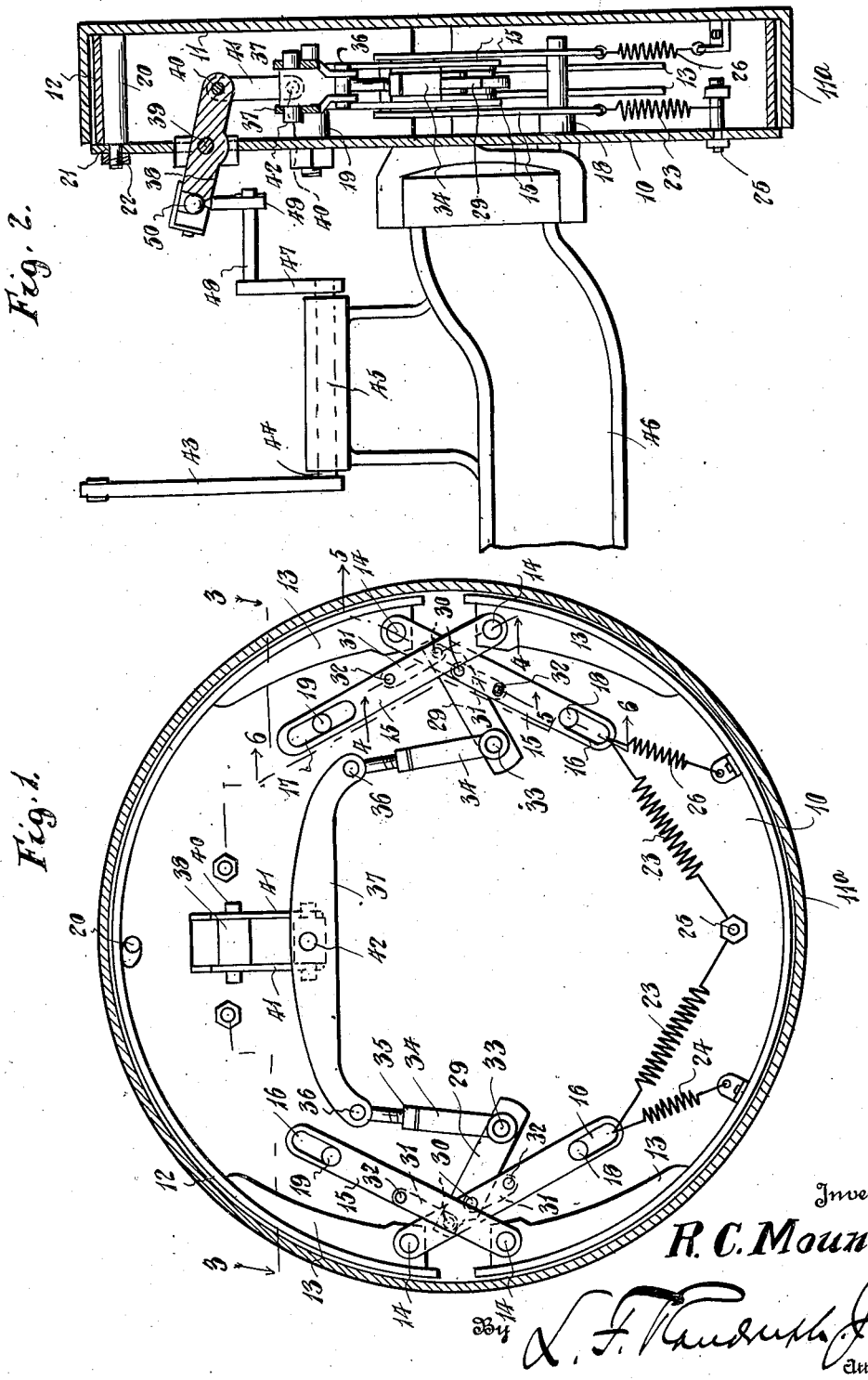
Inventor
R. C. Mountz Oct. 20, 1931.  R. C. MOUNTZ  1,828,612

BRAKE MECHANISM

Filed Aug. 21, 1930  3 Sheets-Sheet 2

Inventor
R. C. Mountz.
By L. F. Rudolph Jr.
Attorney

Oct. 20, 1931.  R. C. MOUNTZ  1,828,612
BRAKE MECHANISM
Filed Aug. 21, 1930  3 Sheets-Sheet 3
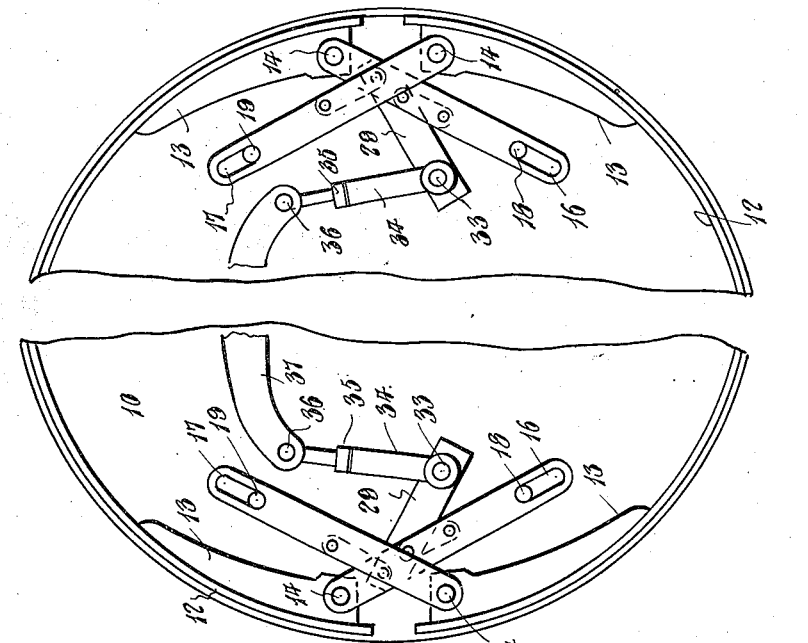
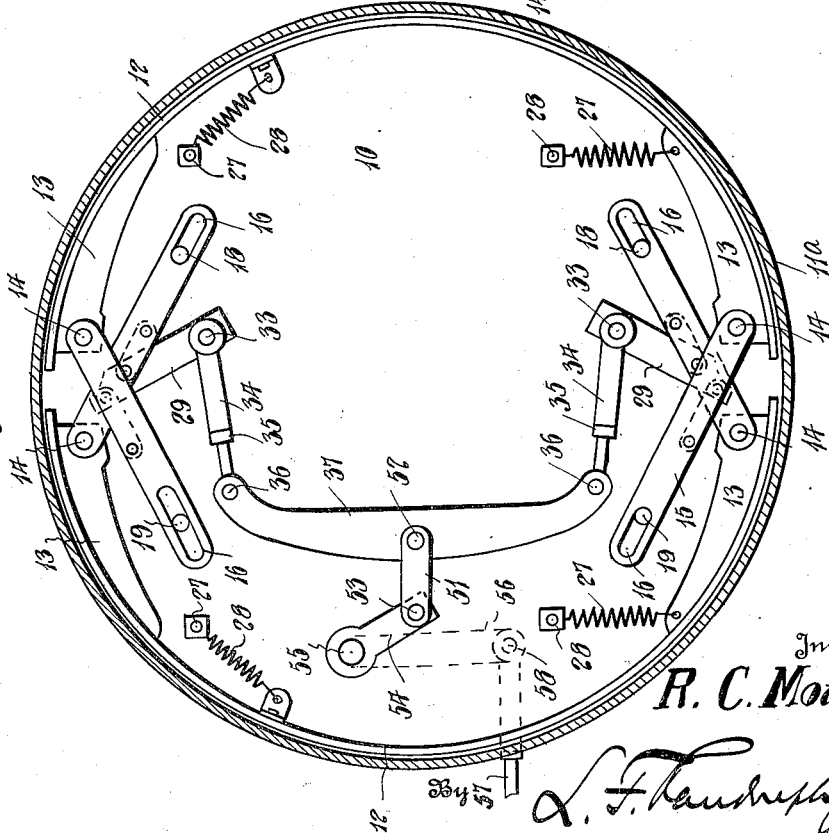
Inventor
R. C. Mountz.

Patented Oct. 20, 1931

1,828,612

UNITED STATES PATENT OFFICE

RAY C. MOUNTZ, OF ALTOONA, PENNSYLVANIA

BRAKE MECHANISM

Application filed August 21, 1930. Serial No. 476,912.

This invention relates to brake mechanism particularly applicable to use on automobile or other wheels and it aims to provide a novel construction in which, no matter in which direction the brake drum is turning, as the shoes grip the drum, they will find their own anchor and cause each shoe to energize or use the friction between the drum and brake shoes to help or assist in applying the brakes.

Specific embodiments of the invention are hereinafter described in connection with accompanying drawings and the more specific objects and advantages will appear hereinafter in connection with said description.

In said drawings:—

Figure 3:
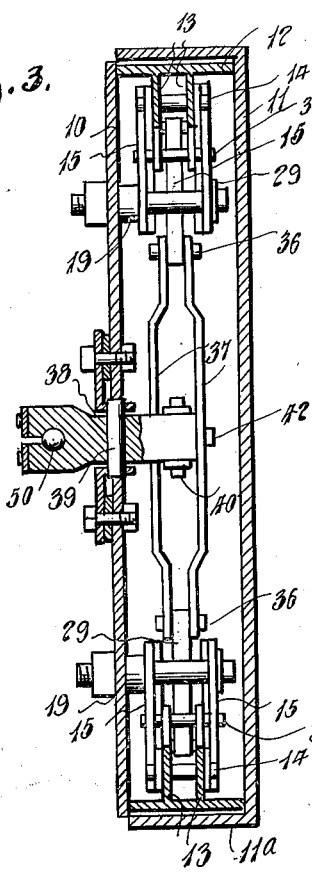
Figure 4:
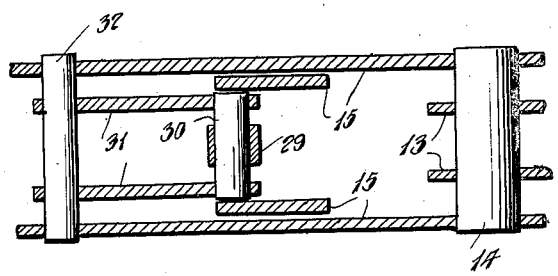
Figure 5:
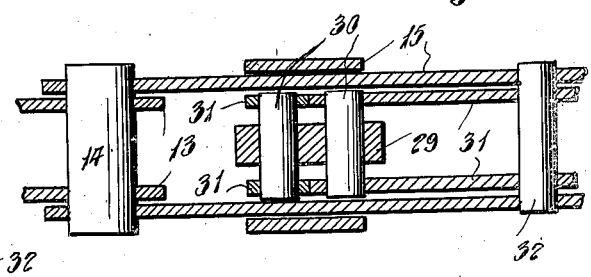
Figure 6:
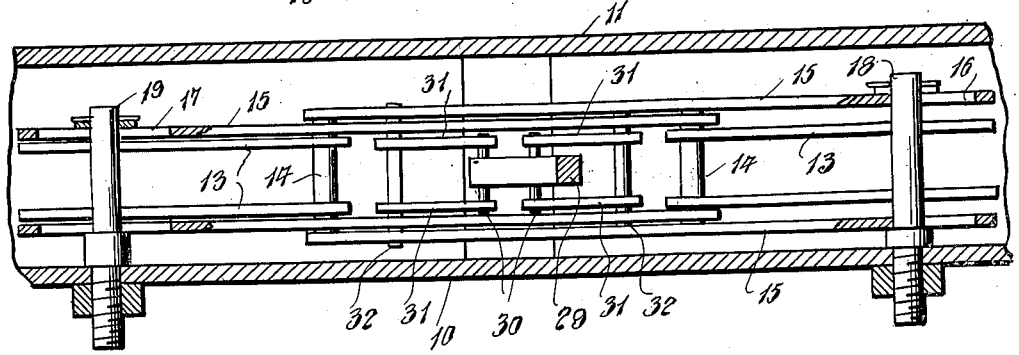

Figure 1 is an elevation showing a brake mechanism according to the invention as applied to a front wheel of an automobile, Figure 2 is a vertical sectional view through said brake mechanism and associated mounting parts of an automobile, Figures 3, 4, 5 and 6, respectively, are sectional views taken on the line 3—3, 4—4, 5—5, and 6—6 of Figure 1, Figure 7 is an elevation similar to Figure 1 but of brake mechanism as applied to a rear wheel, and Figure 8 is a view partly broken away, of a modified form of the front wheel brake mechanism.

Referring first to the invention as disclosed in Figures 1 to 7, inclusive, the brake mechanism is applied to the front and rear wheels of an automobile, for example, is best contrasted in Figures 1 and 7 and the parts preferably being arranged in positions of ninety degrees variation. In connection with each of the front and rear wheels, a stationary or brake plate is employed as at 10 which is mounted in any suitable manner and with which coacts a usual brake drum 11 which is rotatable with the adjacent wheel, such drum having an inwardly extending rim as at 11ª.

Coacting with the rim 11ª of the drum 11 in the case of both the front and rear wheel braking mechanisms, are a pair of brake shoes 12 each substantially semi-circular and being of conventional form, for instance being made of resilient metal and suitably lined. In the case of the front wheels, the free ends of the shoes 12 meet in a horizontal plane while in the case of the rear wheel brake mechanism they preferably meet in a vertical plane as shown in Figure 7. Adjacent the ends of each brake shoe 12 is a block 13 which is of metal and welded or otherwise fastened to the shoe.

Pivotally connected at 14 to the block 13 are anchor links 15. The anchor links adjacent block 13 cross each other and at the ends opposite the pivot 14 such links are provided with elongated slots as at 16 and 17. Anchor studs 18 and 19, are rigidly fastened to the plate 10 in any suitable manner and are disposed in the said slots 16 and 17. The upper brake shoe 12 in the form of the front wheel brake mechanism as in Figures 1 and 2, is upheld by a stud 20 which is of cam form and adjustable so as to vary the position which the brake shoe 12 will normally hold and may move away from the brake drum. Such stud 20 preferably has a screw threaded shank 21 thereon passed through the plate 10 and secured in its different adjusted positions by a nut 22 threaded on said shank and adapted to bind against said plate. Said upper shoe 12 in Figures 1 and 2 will normally rest on the stud 20, aided by contractile coil springs 23 and 24, fastened to the anchor links 15 and the former as at 25 to the plate 10 and the latter as at 26 to the lower shoe 12. Such springs 23 and 24 are thus strong enough to support the weight of the shoes 12 in holding them in unapplied position.

In lieu of the spring arrangement at 23 and 24 used in connection with front wheel brake mechanism, springs 27 are preferably used in connection with the rear wheel brake mechanism as shown in Figure 7, such springs being contractile and fastened to the block 13 and as at 28 fastened to the plate 10, such springs 27 being only of sufficient tension to support the weight of the shoes and associated parts in retracted or unapplied position.

It will be noted that the springs in the two forms described, maintain the stud 18 in abutment with one end of the slot 16 while the stud or lug 19 is maintained intermediate the ends of the slot 17.

Operating bars are provided at 29 to each of which is pivoted at 30, two pairs of relatively short links 31, in turn pivoted at 32, to the respective adjacent anchor links 15. Pivoted as at 33 to the operating bars 29 are connecting rods 34 preferably having turn buckles 35 therein so that they may be adjusted, the opposite ends of which are pivoted as at 36 to a cross bar 37.

In the form of the invention used with the front wheels as in Figures 1 and 2, the bar 37 is adapted to be raised to apply the brake. To this end, a lever 38 mounted at 39 on the plate 10 to pivot on a horizontal fulcrum, is pivoted at 40 to a link 41 which in turn is substantially universally pivoted or connected as at 42 to the cross bar 37. The lever 38 is adapted to be rocked vertically in order to apply and release the brake in any suitable manner, as through the actuation of either a foot or hand controlled lever 43, the same having a fulcrum rod 44 extending therefrom and mounted in a bearing as at 45 on the front axle 46. An arm 47 extends from the rod 44 and has a laterally extending pin 48 on which a link 49 is pivoted which has a ball and socket connection as at 50 with said lever 38.

In the case of the rear wheel brake mechanism, the cross bar 37 is adapted to be moved horizontally or to the right in Figure 7 to release the brake and to the left in said figure to apply the brake. In order to actuate the cross bar 37 in connection with the rear wheel, a link 51 is pivoted thereto as at 52 and at 53 is pivoted to a link 54 rigid with a pin 55 pivoted to plate 10 and from which a crank 56 extends having an actuating rod 57 pivoted thereto as at 58.

Presuming operation, in the case of both the brake shoes 12 of the front and rear wheel brake mechanism, no matter in which direction the brake drum is turning, as the shoes grip the drum they will find their own anchor through the linkage specifically described, causing each shoe to energize or use the friction between the drum and brake shoes to help in applying the brakes. When the brakes are applied with the car in forward motion, the shoe connected with the links 15 having the slot 17 therein will not anchor on the stud 19 but the latter will simply serve as guides since the shoes will anchor through the links 31 and 15 which take their anchor in the case of Figure 1 on the stud 18 (left side) and in the case of Figure 7 on the stud 18 (lower right side). The gripping action between the brake drum and shoe has a tendency to move the bar 29 on the right hand side down which pulls down on the right hand end of the cross head 37 causing increased pressure on the left hand linkage mechanism. The location of such stud 19 in the center of the slot increases the energizing action of the shoes.

The stud 19 if desired, may be replaced by a stud 18 and the slot 17 replaced by a slot 16 in which event, each link or member 15 will have a similar slot 16 and coacting stud 18 as is shown for example in the modified form of Figure 8. In that event, the action of the brake shoes will be similar.

Various changes may be resorted to provided they fall within the spirit and scope of the invention.

I claim as my invention:—

1. Mechanism for operating adjacent brake shoe portions, comprising anchor links pivoted to the brake shoe portions, a support, pin and slot connections between said support and said links, an operating member, means to move the operating member, and links connected to the operating member and to the said anchor links.

2. Mechanism for operating adjacent brake shoe portions, comprising anchor links pivoted to the brake shoe portions, a support, pin and slot connections between said support and said links, an operating member, means to move the operating member, links connected to the operating member and to the said anchor links, and spring means normally maintaining the anchor links in engagement with the stud at one end of the slot.

3. Mechanism for operating adjacent brake shoe portions, comprising anchor links pivoted to the brake shoe portions, a support, pin and slot connections between said support and said links, an operating member, means to move the operating member, links connected to the operating member and to the said anchor links, the pin at one of said connections being intermediate the ends of the slot and out of engagement therewith normally.

4. A brake mechanism comprising brake shoes, cross anchor links pivoted to said shoes, pin and slot connections between said links and a support, operating bars, links pivoted to the operating bars and to said anchor links, and means to simultaneously actuate said operating bars.

5. A brake mechanism comprising brake shoes, cross anchor links pivoted to said shoes, pin and slot connections between said links and a support, operating bars, links pivoted to the operating bars and to said anchor links, means to simultaneously actuate said operating bars operable toward and away from the axis of the adjacent wheel.

6. A brake mechanism in combination with a brake plate, adjacent brake shoe portions, cross anchor links pivoted to said portions, pin and slot connections between said plate and said links, an operating element unconnected to said plate, means connecting said element to both of said anchor links, and means to actuate said element.

In testimony whereof I affix my signature.

RAY C. MOUNTZ.